Jan. 17, 1939.   F. C. SELLECK   2,144,465
LIQUID DISPENSING APPARATUS
Filed Oct. 18, 1937   3 Sheets—Sheet 1

Inventor:
Frederick C. Selleck
By F. E. Anderson
His Attorney

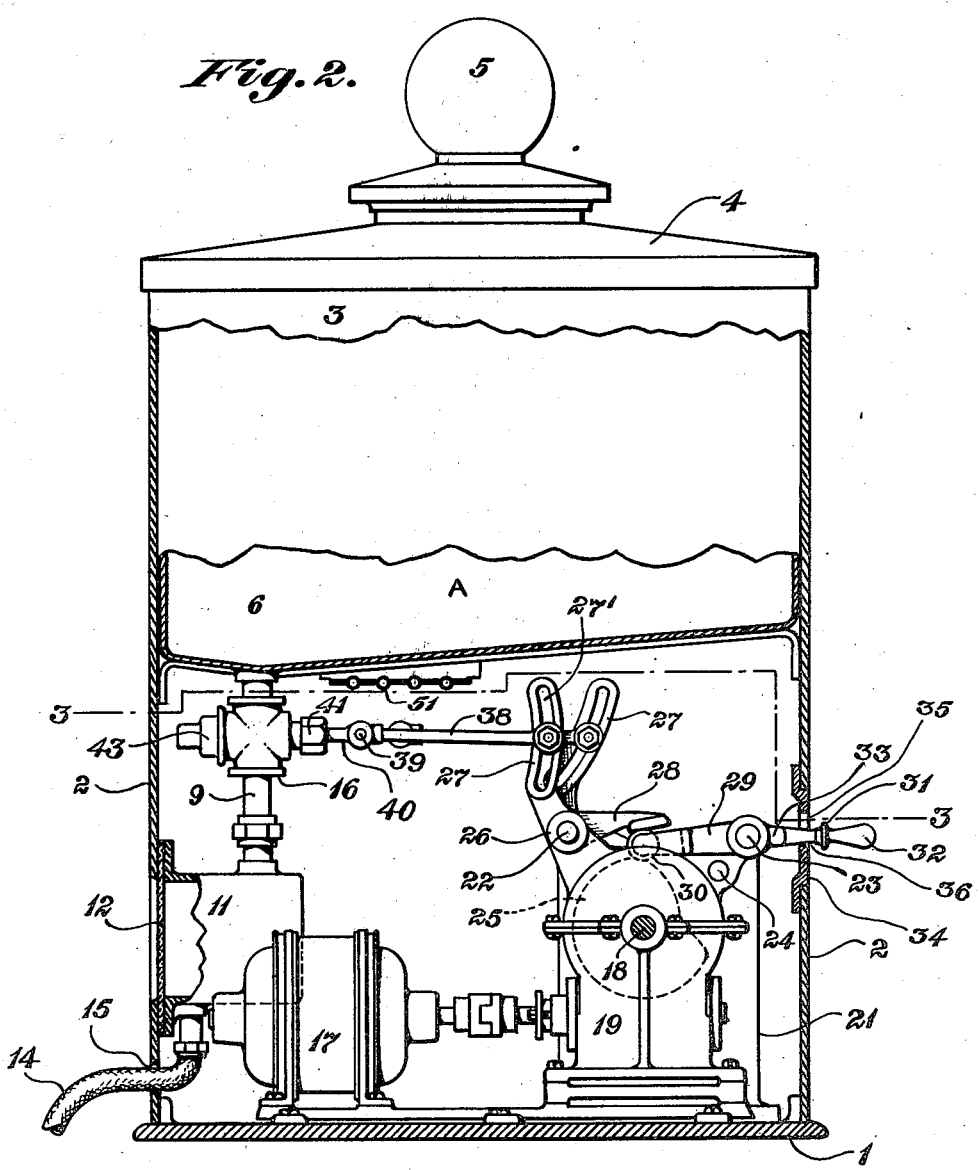

Jan. 17, 1939.　　　F. C. SELLECK　　　2,144,465
LIQUID DISPENSING APPARATUS
Filed Oct. 18, 1937　　　3 Sheets-Sheet 3
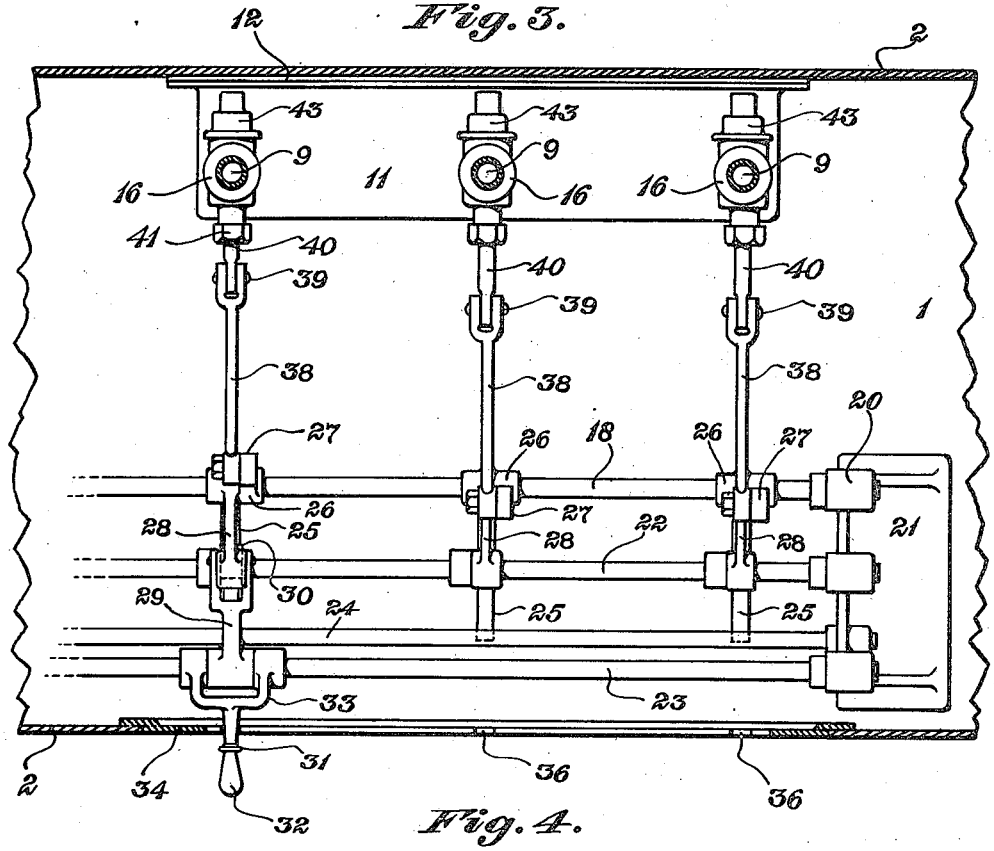
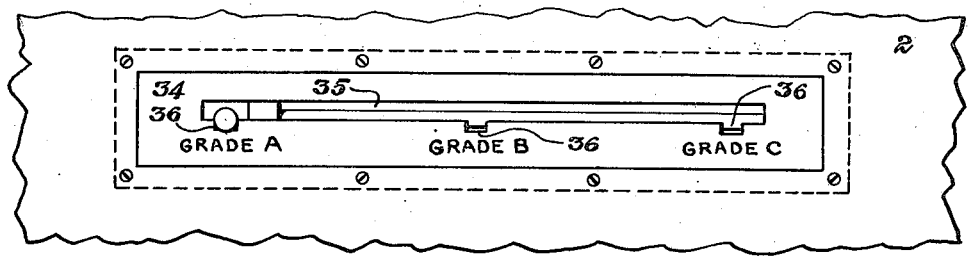
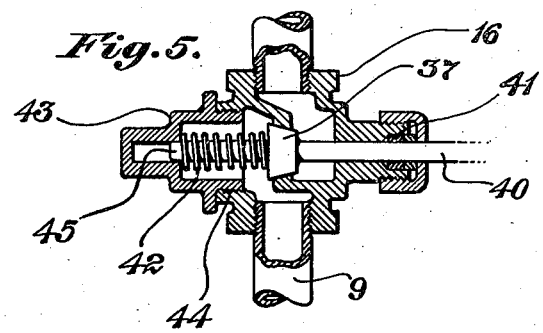
Inventor
Frederick C. Selleck
By F. E. Anderson
His Attorney Patented Jan. 17, 1939

2,144,465

UNITED STATES PATENT OFFICE 2,144,465

LIQUID DISPENSING APPARATUS

Frederick C. Selleck, Cold Spring, N. Y.

Application October 18, 1937, Serial No. 169,576

5 Claims. (Cl. 221—101)

This invention relates to liquid dispensing apparatus and is particularly directed to the provision of means associated with a tank enclosing structure or casing whereby any one of several grades of lubricating oil contained in respective compartments housed with the casing may be delivered through a common outlet hose directly to filler openings of motor driven carriers such as automobiles.

A further object of the invention is the provision of motor driven means whereby flow of oil from any one of several compartments included in a unitary structure may be controlled for delivery through a common outlet.

Another object of the invention is the provision of means whereby oil from any one of several compartments included in a unitary structure may be directed through a respective conduit to a compartment in which a measured quantity of the oil (as for example a quart) is visibly indicated and therefrom delivered through a hose directly to a motor.

Another object of the invention is the provision of motor driven valve actuating mechanism associated with means operable to automatically stop the motor when a valve has been opened for a predetermined period.

Another object of the invention is the provision of a selector element movable into operative opening relation between any one of several valves and respective motor driven elements, each valve controlling flow of a different grade of oil.

With the above and other objects in view, as will hereinafter appear, the invention comprises devices, combinations and arrangements of parts set forth in the following detailed description and illustrated in the accompanying drawings of one form of embodiment of the invention, from which characteristics of the invention and the advantages attained thereby will be readily understood. It will further be understood that the invention is not limited to the exact form and arrangement shown and described but may be varied in many respects without departure from the scope of the invention as defined by the appended claims.

In the drawings,

Figure 2 is a sectional view on line 2—2 of Fig. 1.

Figure 3 is a sectional view on line 3—3 of Fig. 2.

Figure 4 is a detail view of a portion of the rear of the casing.

Figure 5 is a detail sectional view of a conduit and valve.

Figure 1:
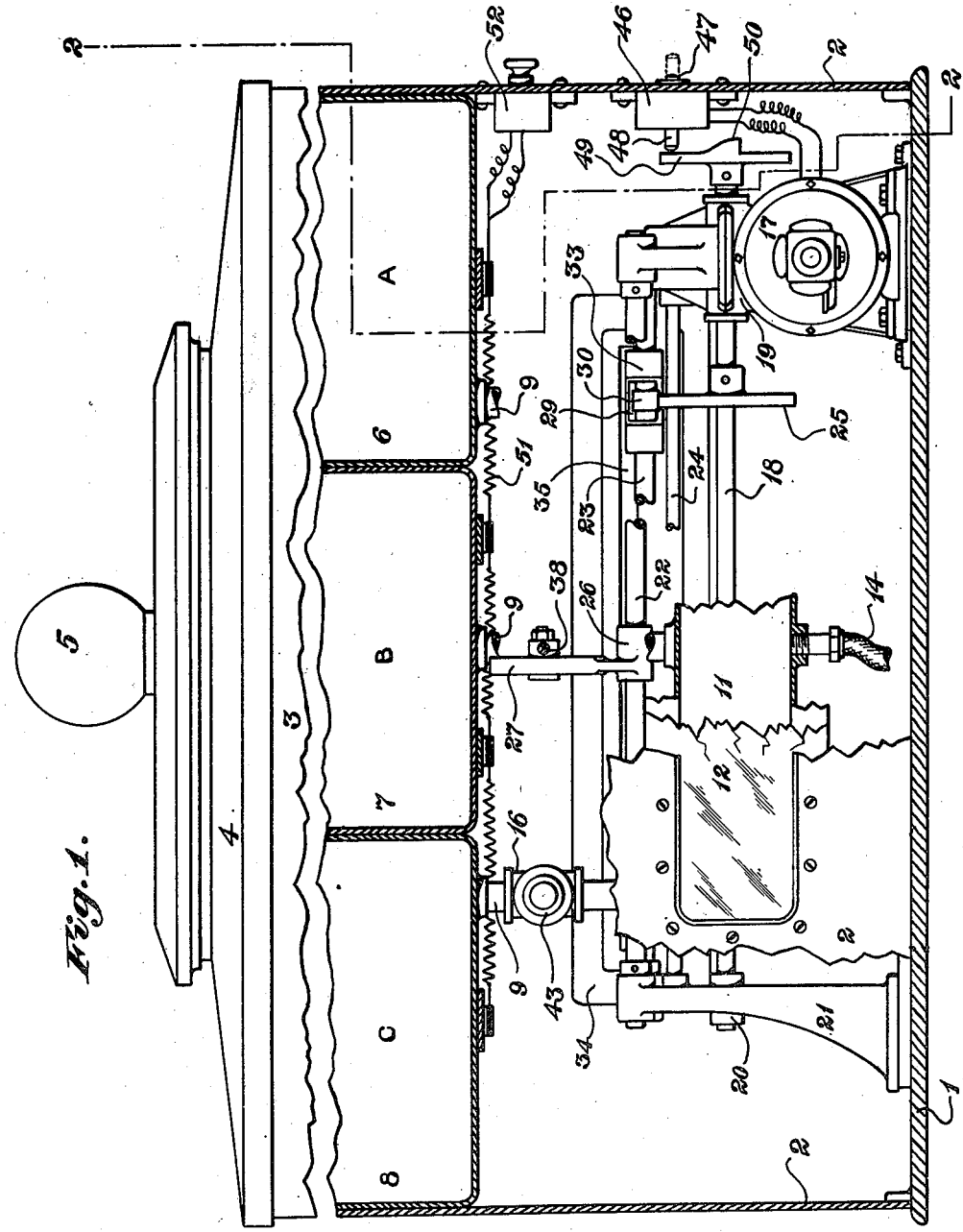
Figure 1 is a front view of an oil dispensing apparatus embodying by invention, with the casing and other parts partly cut away to disclose interior mechanism of which certain duplicated parts are omitted to more clearly show associated parts.

Referring to the drawings the oil dispensing structure illustrated includes a base plate 1 which provides suitable support for mechanism enclosed by sheet metal sides 2 of casing 3 which is provided with a top closure 4. The latter may be surmounted with glass globe 5 to provide ornamentation and an enclosure for light bulbs as well as an area for advertising matter.

Several tank compartments as 6, 7 and 8 are supported in the upper part of the casing for containing supply of various grades of oil such as may here be indicated respectively by A, B and C. From each supply tank a conduit as 9 leads to a measuring compartment 11 supported on the front of the casing together with a transparent insert 12 which provides for visible indication of the amount of oil contained by the compartment, such as a quart, the usual unit of measurment used for sale of motor oil. For delivery of this measured quantity, as directly to the motor of an automobile, a hose 14 is provided leading from the bottom of the compartment 11 through an opening 15 in casing 3. Each conduit 9 is provided with a respective valve 16 for controlling flow of oil from respective supply tanks to the measuring compartment 11.

Means for selectively connecting mechanism for opening any one of the several valves 16 with a source of power for a period sufficient to fill the measuring compartment will now be described. Such a source of power may comprise the motor 17 for driving shaft 18 through a reducing gear unit 19 at a comparatively slow rate of speed. Shaft 18 supported at one end by gear unit 19 may be further supported at its other end in journal 20 of standard 21. Also supported by the gear unit and standard are rods 22, 23 and 24 extending in parallelism with shaft 18 for a purpose that will presently appear. Keyed to shaft 18 are several cams as 25 corresponding in number and respectively oppositely disposed to valves 16, while interposed between each cam and valve is a lever 26 freely mounted for oscillatory movement on rod 22. Each lever 26 consists of a slotted arm 27 and an arm 28, the latter being opposed to its respective cam 25 but separated therefrom so that the cam has no effect thereon unless suitable means are interposed between it and said arm 28. Such means may comprise an arm 29 supported for oscillatory movement on rod 23 and also movable longitudinally of the rod so that it may be interposed between any one of the cams 25 and its respective cooperating lever arm 28. Arm 29 is provided at its outer end with an antifriction roll 30 for contact with the aforesaid elements between which it is adapted to be interposed. For manually shifting arm 29 into operative relation with any one of the several cams 25, a selector member 31 is provided. It consists of a handle 32 terminating in a yoke 33 which is sleeved upon rod 23 to straddle the hub of arm 29. The handle 32 extends through a panel 34 secured to casing 3, said panel being slotted at 35 to receive the handle, and the lower edge of the slot being notched as at 36 to permit the handle to drop into locking engagement therewith when the selector is in position to place arm 29 for cooperation with respective cams 25. To maintain arm 29 in such elevated position that it can be moved into position to cooperate with cams 25, rod 24 acts as a stop to limit its downward drop when it is moved from one cam to another.

From the foregoing it will be clear that any one of levers 26 may be made to oscillate on its support through the effect of its respective cam 25. To transfer the effect of such oscillation to a respective valve 16, arm 27 of each lever is connected to the respective movable valve element 37 by a rod 38 which is pivoted at 39 to valve stem 40 which is extended through stuffing box 41. To normally hold the movable valve element 37 in closed position, a spring 42 is opposed thereto by a shouldered member 43 threaded into the valve wall at 44. This member also acts as a guide to valve stem 45 which is surrounded by the spring.

As above stated cam shaft 17 rotates at a low rate of speed. It is so timed that one revolution of a cam may cooperate with the interposed means described, to hold a valve open for an interval just sufficient to permit the desired measured quantity of liquid to flow from a respective supply tank to the visibly measuring compartment 11. For exactly controlling this flow under different conditions, such as change in temperature and variation in fluidity, means are provided whereby the amount of valve opening effected by action of a cam may be changed. To serve this purpose, adjustment of the connection between lever arm 27 and valve actuating rod 38 is permitted by the slot 29', that is to say, the effective throw of the arm 27 may be varied so as to hold the valve open a greater or lesser amount for the given period of valve opening determined by duration of rotation of the cam.

Means for control of the motor 16 may comprise a snap switch as 46 having exterior to casing 3 a button 47 for manipulation to start the motor and a button 48 inside the casing which may be cam operated to stop the motor. Such a cam 49 having a short button-actuating lug 50 is secured to shaft 17 and is so arranged that it will throw the switch to stop the motor after the cam shaft has made one revolution.

Assuming that a quart of grade A oil is to be delivered from the tank structure, the method of proceedure is as follows: First selector handle 32 is moved along slot 35 until it drops into notch 36 which is marked "Grade A". Then the snap switch button 47 is pressed in to start motor 17, which after one revolution of the cam shaft 18 is stopped by cam lug 50 which actuates switch button 48 to stop the motor. During this period of motor operation the valve for controlling flow of oil from tank compartment 6, has been open just long enough to fill visible measuring compartment 11 and this measured quantity may next be delivered directly to a motor through delivery hose 14.

As an added precaution to insure that the above described apparatus will effectively operate in extreme cold weather provision may be made for keeping the oil in storage tanks at suitable temperature. This may be provided for by the installation of heating grids as 51 supported beneath the tanks and connected with a source of current which may be applied in different degree by a high-low switch as 52.

Having thus described my invention, what I claim is:—

1. Liquid dispensing apparatus including in combination, a liquid storage compartment, a liquid measuring compartment, a conduit connecting the compartments, a normally closed valve in the conduit, a driven shaft, a cam on the shaft, a rock lever supported adjacent the cam, means for connecting one arm of the lever with the valve, and movably supported means adapted to be interposed between the other arm of the lever and the cam to render the cam effective to actuate the rock lever to open the valve.

2. Liquid dispensing apparatus including in combination, a liquid storage compartment, a liquid measuring compartment, a conduit connecting the compartments, a valve in the conduit, a spring for normally closing the valve, a driven shaft, a cam on the shaft, a rock lever supported adjacent the cam, a connecting member pivotally associated with one arm of the rock lever and with the valve, means for permitting adjustment of the pivotal lever connection of the connecting member along the arm of the lever, and movably supported means adapted to be interposed between the other arm of the lever and the cam.

3. Liquid dispensing apparatus including in combination, a series of liquid storage compartments, a liquid measuring compartment, a conduit connecting each storage compartment with the measuring compartment, a normally closed valve in each conduit, means including a rock lever associated with each valve, a driven shaft, a cam on the shaft adjacent each rock lever, and movably supported means adapted to be interposed between any one of the cams and its rock lever to render the cam effective to actuate the lever and open its respective valve.

4. Liquid dispensing apparatus including in combination, a series of liquid storage compartments, a liquid measuring compartment, a conduit connecting each storage compartment with the measuring compartment, a normally closed valve in each conduit, means including a rock lever associated with each valve, a driven shaft, a cam on the shaft adjacent each rock lever, a rod supported in parallelism to the cam shaft, an arm pivotally and longitudinally movable on the rod, a handle pivotally supported by the rod and movable longitudinally thereof together with the arm to interpose the free end of the latter between any one of the cams and its rock lever, and respective stop means engageable by the handle when the arm is in position for operative engagement with any one of the cams.

5. Liquid dispensing apparatus including in combination, a casing, a series of liquid storage compartments supported within the upper part of the casing, a liquid measuring compartment supported below the storage compartments and having a transparent side adjacent an opening in the side of the casing, a conduit connecting each storage compartment with the measuring compartment, a normally closed valve in each conduit, opening mechanism associated with each valve, a driven shaft, a cam on the shaft for each valve, a rod adjacent the cam shaft, a panel supported by the casing adjacent the rod and having a slot therein with a notch in the lower edge of the slot opposite each cam, means movable along the rod for selectively associating any one of the cams with respective valve opening mechanism, and a handle associated with the last mentioned means extended through the slot in the panel and adapted to engage the notches to definitely locate the means for operatively associating the cams with the valve opening mechanism.

FREDERICK C. SELLECK.